(12) United States Patent
Koma et al.

(10) Patent No.: US 7,944,202 B2
(45) Date of Patent: May 17, 2011

(54) ROTATION ANGLE DETECTOR

(75) Inventors: Tetsuya Koma, Fukui (JP); Toshio Tanaka, Fukui (JP)

(73) Assignee: Panasonic Corporation, Osaka (JP)

( * ) Notice: Subject to any disclaimer, the term of this patent is extended or adjusted under 35 U.S.C. 154(b) by 440 days.

(21) Appl. No.: 12/109,880

(22) Filed: Apr. 25, 2008

(65) Prior Publication Data
US 2008/0278150 A1    Nov. 13, 2008

(30) Foreign Application Priority Data
May 7, 2007    (JP) .................................. 2007-122068

(51) Int. Cl.
*G01B 7/30*    (2006.01)
*G01M 17/06*    (2006.01)

(52) U.S. Cl. ................ 324/207.25; 73/117.02

(58) Field of Classification Search ............. 324/207.25; 33/1 PT; 73/117.02; 180/443, 444, 447
See application file for complete search history.

(56) References Cited

U.S. PATENT DOCUMENTS
2003/0019113 A1 *  1/2003  Kofink et al. ................ 33/1 PT FOREIGN PATENT DOCUMENTS
JP    2006-258625    9/2006
* cited by examiner

*Primary Examiner* — Kenneth J Whittington
(74) *Attorney, Agent, or Firm* — Wenderoth, Lind & Ponack, L.L.P.

(57) ABSTRACT

A rotation angle detector is arranged to detect a rotation angle of an object. The rotation angle detector includes a rotor that rotates about a rotation axis according to a rotation of the object, a detecting unit for detecting a rotation of the rotor, a controller for detecting a rotation angle of the rotor based on a detection signal output from the detecting unit, and a case for accommodating the rotor rotatably. The case has at least three elongate holes provided therein. The elongated holes have longitudinal directions extending radially from the rotation axis of the rotor.

5 Claims, 8 Drawing Sheets

ROTATION ANGLE DETECTOR

FIELD OF THE INVENTION

The invention relates to a rotation angle detector for detecting a rotation angle of an object, such as a steering wheel of a vehicle.

BACKGROUND OF THE INVENTION

Advanced functions have been recently installed into vehicles. The vehicles include various rotation angle detectors for detecting rotation angles of steering wheels to control various functions of the vehicle according to the detected rotation angles.

FIG. 6 is an exploded perspective view of conventional rotation angle detector 10. Flat gear 1A is provided on a side surface of rotor 1. Through-hole 1D is formed in the center of rotor 1, and engaging parts 1B and 1C protrude from an inner circumference of through-hole 1D.

Flat gear 2A is provided on an outer circumference of first detecting body 2. Flat gear 3A is provided on an outer circumference of second detecting body 3. Flat gear 3A has a different number of teeth than flat gear 2A. Flat gear 2A of first detecting body 2 is engaged with flat gear 1A of rotor 1. Flat gear 3A of second detecting body 3 is engaged with flat gear 2A of detecting body 2.

Wiring board 4 is located substantially in parallel with first detecting body 2 and second detecting body 3. Wiring patterns are provided on both surfaces of the board. Magnetic sensors 5B and 6B are mounted onto wiring board 4. Magnet 5A is attached to the center of first detecting body 2, and magnet 6A is attached to the center of second detecting body 3. Magnetic sensors 5B and 6B face magnets 5A and 6A, respectively.

Magnet 5A and magnetic sensor 5B facing each other constitute first detecting unit 105, and magnet 6A and magnetic sensor 6B facing each other constitute second detecting unit 106. A microprocessor and other electronic components mounted on wiring board 4 constitute controller 7.

Case 8 has substantially a box shape and is made of insulating resin. Cover 9 is made of insulating resin. Rotor 1, first detecting body 2 and second detecting body 3 are held rotatably in case 8. Wiring board 4 is fixed to the case. Rotor 1, detecting bodies 2 and 3, and wiring board 4 are accommodated in cover 9. Case 8 has through-hole 8A provided therein. Cover 9 has through-hole 9A provided therein. A steering shaft is inserted into through-holes 8A and 9A.

The centers of through-holes 8A and 9A agrees with a rotation axis of rotor 1. Case 8 has round hole 8B and elongate hole 8C provided therein at positions symmetrical to each other with reference to the rotation axis of rotor1.

FIG. 7 is an exploded perspective view of a vehicle having conventional rotation angle detector 10 installed therein. Rotation angle detector 10 detects a rotation angle of steering wheel 11, an object to be detected. Rotation angle detector 10 is arranged behind steering wheel 11 and mounted to a vehicle. Controller 7 is connected to an electronic circuit of the vehicle via a connector and a wire.

Rotary coupler 12 includes fixed housing 13 fixed to the vehicle, and rotatable housing 14 attached to fixed housing 13 rotatably with reference to fixed housing 13. A flexible cable is wound and contained in fixed housing 13. Rotatable housing 14 has through-hole 14A provided therein. An inner circumference of through-hole 14A is engaged with steering shaft 15.

FIGS. 8A and 8B are plan views of a conventional rotation angle detector. 10. Cutouts 14B and 14C formed in rotatable housing 14 are engaged with engaging parts 1B and 1C, respectively. Pins 13B and 13C having columnar shapes are provide on fixed housing 13 and inserted into round hole 8B and elongate hole 8C, respectively. Thereby, rotation angle detector 10 is held to rotary coupler 12 fixed to the vehicle.

Steering wheel 11 is rotated, and rotatable housing 14 engaged with steering shaft 15 rotates accordingly. Rotor 1 having engaging parts 1B and 1C engaging cutouts 14B and 14C of housing 14 rotates according to the rotation of rotatable housing 14.

Rotor 1 rotates, and first detecting body 2 rotates accordingly. Second detecting body 3 rotates according to the rotation of first detecting body 2. Magnets 5A and 6A attached to the centers of detecting bodies 2 and 3 rotate accordingly. The rotations of magnets 5A and 6A change magnetic fields from magnets 5A and 6A applied to magnetic sensors 5B and 6B. Magnetic sensors 5B and 6B detect the change of the magnetic fields as detection signals. First detecting body 2 and second detecting body 3 have different numbers of teeth and rotate at different rotation speeds, hence causing magnetic sensors 5B and 6B to output the signals having different cycles and different phases.

Controller 7 detects a rotation angle of rotor 1, i.e., a rotation angle of steering wheel 11, the object to be detected, based on the detection signals output from first detecting body 2 and detecting body 3 and the number of teeth of each of first detecting body 2 and second detecting body 3. Controller 7 outputs the detected rotation angle to the electronic circuit of the vehicle to perform various controls for controlling the vehicle.

Components, such as case 8, rotor 1, rotatable housing 14, and fixed housing 13, of rotary coupler 12 and rotation angle detector 10 are generally made of insulating resin, and hence, thermally expand and contract at high temperatures and low temperatures. Since having different sizes and being made of different materials, the components have different dimensional changes due to the thermal expansion and contraction, thereby causing a displacement between the components.

Rotation angle detector 10 and rotary coupler 12 have sizes larger than other components, accordingly having large dimensional changes due to the thermal expansion and contraction. In order to reduce the displacement due to the large dimensional changes, pin 13B having the columnar shape is inserted into round hole 8B, and pin 13C is inserted into elongate hole 8C. When case 8 expands in a direction D101 to the right, as shown in FIG. 8B, pin 13C moves in elongate hole 8C and absorbs the dimensional changes caused by the expansion, thereby preventing rotation angle detector 10 from malfunction due to warping or other deformation of the components.

Regarding the connection between rotor 1 and rotatable housing 14, however, gap L101 may be produced between engaging part 1C and cutout 14C due to the dimensional changes, while the changes are smaller than 0.5 mm. Gap L101 may produce an error between the rotation angles of rotor 1 and rotatable housing 14 engaged with steering shaft 15.

SUMMARY OF THE INVENTION

A rotation angle detector is arranged to detect a rotation angle of an object. The rotation angle detector includes a rotor that rotates about a rotation axis according to a rotation of the object, a detecting unit for detecting a rotation of the rotor, a controller for detecting a rotation angle of the rotor based on a detection signal output from the detecting unit, and a case for accommodating the rotor rotatably. The case has at least three elongate holes provided therein. The elongated holes have longitudinal directions extending radially from the rotation axis of the rotor.

This rotation angle detector detects the rotation angle of the object reliably with a simple structure.

DESCRIPTION OF THE PREFERRED EMBODIMENT

Figure 1:
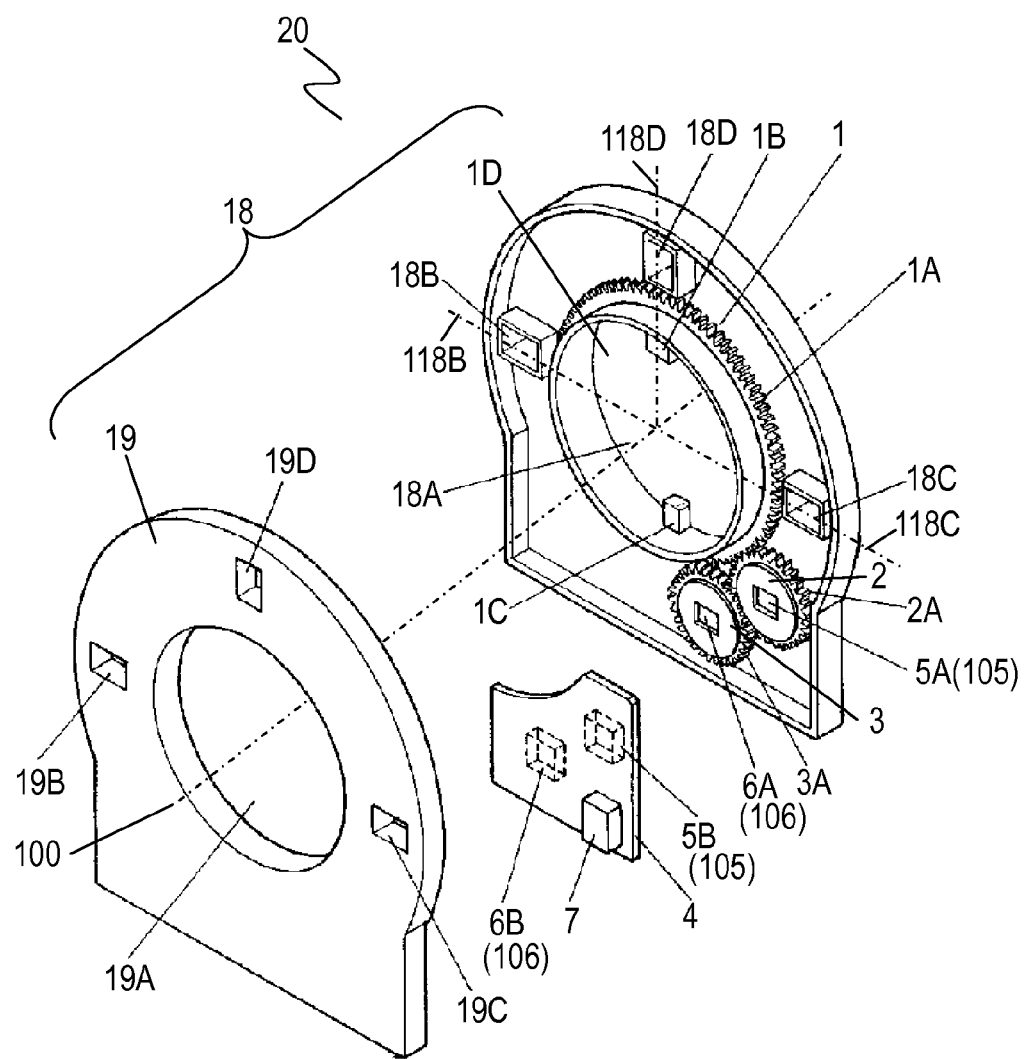
FIG. 1 is an exploded perspective view of a rotation angle detector in accordance with an exemplary embodiment of the present invention.
Figure 2:
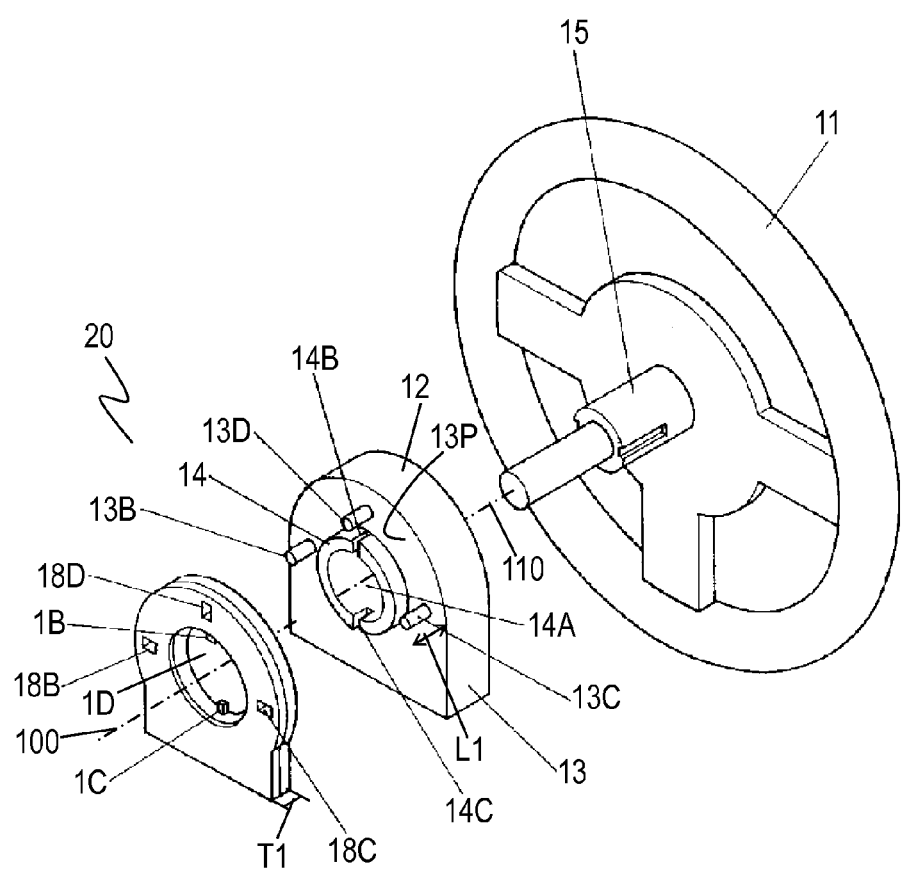
FIG. 2 is an exploded perspective view of a vehicle having the rotation angle detector mounted thereto according to the embodiment.
Figure 3A:
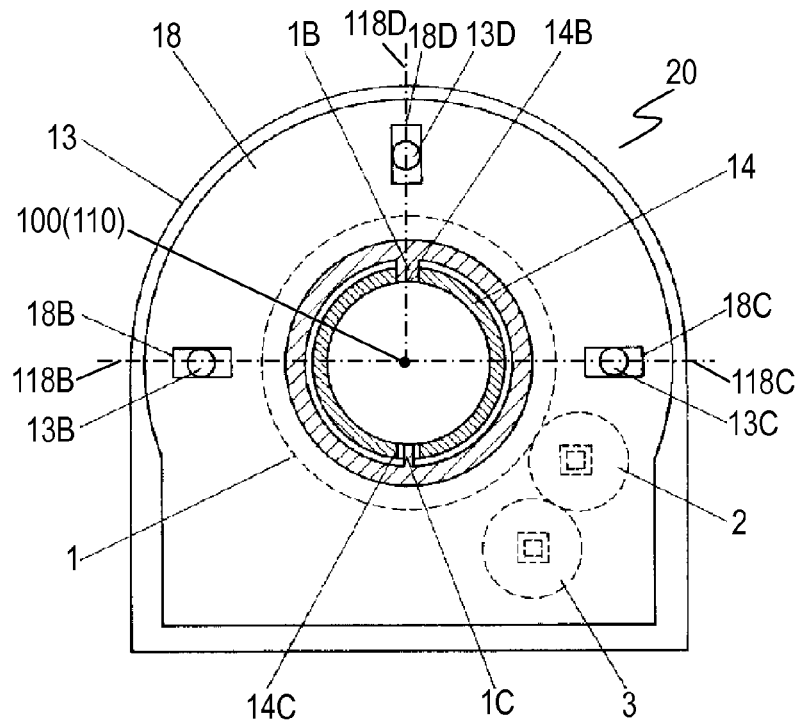
FIGS. 3A and 3B are plan views of the rotation angle detector in accordance with the embodiment.
Figure 3B:
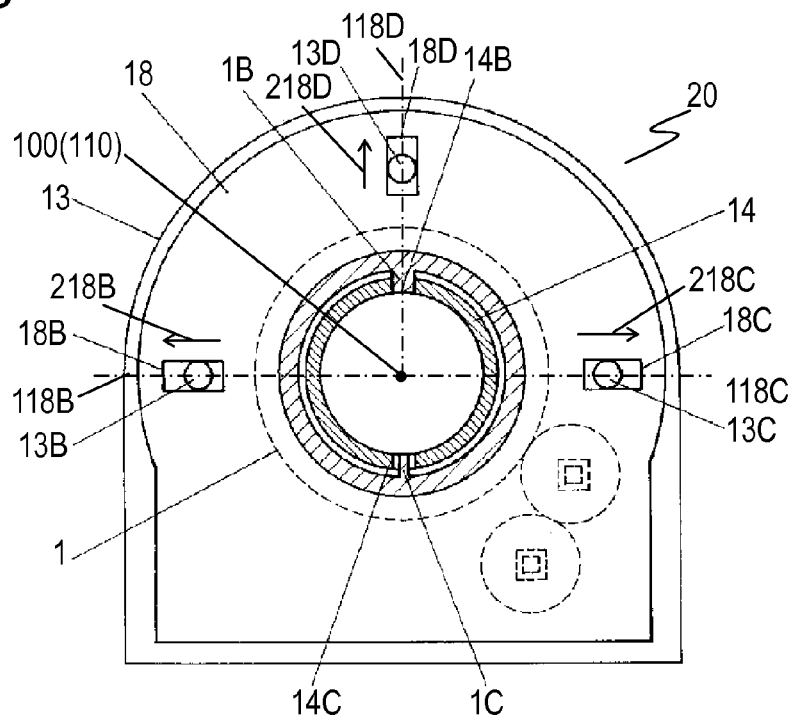

FIG. 1 is an exploded perspective view of rotation angle detector 20 in accordance with an exemplary embodiment of the present invention. FIG. 2 is an exploded perspective view of a vehicle having rotation angle detector 20 mounted thereto according to the embodiment. FIGS. 3A and 3B are plan views of rotation angle detector 20.

As shown in FIG. 1, flat gear 1A is provided on a side surface of rotor 1 made of insulating resin. Hole 1D is formed in the center of the rotor 1. Rotor 1 has engaging parts 1B and 1C protruding from an inner circumference of hole 1D.

Flat gear 2A is provided on an outer circumference, a side surface, of first detecting body 2. Flat gear 3A is provided on an outer circumference, a side surface, of second detecting body 3. Flat gear 3A has a different number of teeth than flat gear 2A. Flat gear 2A of first detecting body 2 is engaged with flat gear 1A of rotor 1. Flat gear 3A of second detecting body 3 is engaged with flat gear 2A of detecting body 2.

Flat gear 1A has more teeth than flat gear 3A. Flat gear 3A has more teeth than flat gear 2A. According to this embodiment, the numbers of teeth of flat gears 1A, 2A and 3A are 87, 29 and 30, respectively.

Wiring board 4 is located substantially in parallel with detecting bodies 2 and 3. Wiring patterns are formed on both surfaces of the board. Magnets 5A and 6A are attached to the centers of detecting bodies 2 and 3, respectively, by, for example, a molding insertion method. Magnetic sensors 5B and 6B, such as anisotropic magnetoresistive (AMR) elements, are fixed onto wiring board 4 and face magnets 5A and 6A, respectively.

Magnet 5A and magnetic sensor 5B facing each other constitute first detecting unit 105. Magnet 6A and magnetic sensor 6B facing each other constitute second detecting unit 106. A microprocessor and other electronic components are mounted onto wiring board 4 and constitute controller 7. Controller 7 is connected to magnetic sensors 5B and 6B via wiring patterns.

Case 18 made of insulating resin having substantially a box shape has cover 19 made of insulating resin. Inside case 18, rotor 1, first detecting body 2, and second detecting body 3 are accommodated rotatably in case 18. Wiring board 4 is fixed to case 18. Rotor 1 is rotatable about rotation axis 100. Through-hole 18A is formed in the center of case 18, while through-hole 19A is formed in the center of cover 19.

As shown in FIG. 3A, three elongate holes 18B, 18C and 18D surrounding rotation axis 100 of rotor 1 are formed in case 18. Elongate holes 18B, 18C and 18D have longitudinal directions 118B, 118C and 118D extending radially from rotation axis 100 and perpendicularly to rotation axis 100. Elongate holes 18B and 18D are located at an angular interval of 90 degrees about rotation axis 100. Elongate holes 18D and 18C are located at an angular interval of 90 degrees about rotation axis 100. Elongate holes 18B and 18C are located at an angular interval of 180 degrees about rotation axis 100. Cover 19 has three elongate holes 19B, 19C and 19D provided therein. Elongate holes 19B, 19C and 19D are combined with elongate holes 18B, 18C and 18D of case 18, respectively.

As shown in FIG. 2, rotation angle detector 20 is located behind steering wheel 11, and is installed in the vehicle. Controller 7 is connected to an electronic circuit of the vehicle via a connector or a wire. Steering shaft 15 is inserted into through-holes 18A and 19A.

Rotary coupler 12 includes fixed housing 13 affixed to the vehicle body and rotatable housing 14 rotatably attached to fixed housing 13. Inside fixed housing 13, a flexible cable is wound. Rotatable housing 14 has through-hole 14A into which steering shaft 15 is inserted through. Steering shaft 15 is engaged with inside-circumference of through-hole 14A. Steering wheel 11 an object to be detected and steering shaft 15 rotate together with rotation axis 110.

As shown in FIGS. 2 and 3A, cutouts 14B and 14C are formed in rotatable housing 14 and are engaged with engaging parts 1B and 1C of rotor 1, respectively. Fixed housing 13 has three pins 13B, 13C and 13D having columnar shapes. Pins 13B, 13C, and 13D protrude toward case 18 of rotation angle detector 20 from surface 13P facing case 18. Pins 13B, 13C and 13D are inserted into elongate holes 18B, 18C and 18D of case 18, respectively, and allow rotation angle detector 20 to be held on rotary coupler 12 fixed to the vehicle. In FIG. 3A, rotation axis 100 of rotor 1 agrees with rotation axis 110 of steering 11, the object to be detected.

Rotation angle detector 20 detects object 11. Rotation angle detector 20 includes rotor 1 rotating about rotation axis 100 according to a rotation of object 11, detecting unit 105 (106) detecting the rotation of rotor 1, controller 7 detecting the rotation angle of rotor 1 based on a detection signal output from detecting unit 105 (106), and case 18 accommodating rotor 1 rotatably. Case 18 has at least three elongate holes 18B, 18C and 8D provided therein. Elongate holes 18B, 18C, and 18D have longitudinal directions 118B, 118C and 118D extending radially from rotation axis 100, respectively. Case 18 is arranged to be positioned by rotary coupler 12 having at least three pins 13B, 13C and 13D protruding toward case 18. Pins 13B, 13C and 13D are inserted into elongate holes 18B, 18C and 18D, respectively.

An operation of rotation angle detector 20 in detecting the rotation angle of steering wheel 11, the object, will be explained below. As steering wheel 11 is rotated, rotatable housing 14 engaged with steering shaft 15 rotates. According to the rotation of rotatable housing 14, rotor 1 having engaging parts 1B and 1C engaging cutouts 14B and 14C of housing 14 rotates.

As rotor 1 rotates, flat gear 2A engaged with flat gear 1A causes first detecting body 2 to rotate according to the rotation of rotor 1. As first detecting body 2 rotates, flat gear 3A engaged with flat gear 2A causes second detecting body 3 to rotate according to the rotation of detecting body 2A. Magnets 5A and 6A attached to the centers of detecting bodies 2 and 3 rotate according to the rotations of detecting bodies 2 and 3, respectively. Magnetic sensors 5B and 6B facing magnets 5A and 6A output detection signals in response to amounts of magnetic field produced by magnets 5A and 6A, respectively. The rotation of magnets 5A and 6A changes the magnetic field detected by magnetic sensors 5B and 6B, accordingly outputting detection signals which change. Since flat gears 2A and 3A of detecting bodies 2 and 3 have numbers of teeth different from each other, the rotation angles of gears 2A and 3A with reference to the rotation angle of rotor 1 are different from each other. Hence, the detection signals output from magnetic sensors 5B and 6B have cycles and phases different from each other.

Controller 7 detects the rotation angle of rotor 1, i.e., the rotation angle of steering wheel 11, the object, based on the detection signals and the numbers of teeth of flat gears 2A and 3A. The detected rotation angle is output to the electronic circuit of the vehicle for performing various controls to the vehicles.

Components, such as case 18, rotor 1, fixed housing 13, and rotatable housing 14, of rotation angle detector 20 and rotary coupler 12 are generally made of insulating resin. These components thermally expand and contract at high temperatures and low temperatures. Since having different sizes and being made of different materials, these components may have their dimensional changes different from each other. Case 18 and fixed housing 13 out of these components having large sizes particularly have large dimensional changes due to the thermal expansion and contraction.

FIG. 3B is a plan view of rotation angle detector 20 including case 18 expanding entirely. Case 18 has elongate holes 18B, 18C and 18D provided therein. Pins 13B, 13C and 13D are inserted into elongate holes 18B, 18C and 18D, respectively, thereby positioning and holding case 18. Elongate holes 18B, 18C and 18D have longitudinal directions 118B, 118C and 118D extending radially from rotation axis 100 and perpendicularly to rotation axis 100. This structure allows case 18 to expand such that elongate holes 18B, 18C and 18D move in longitudinal directions 118B, 118C and 118D away from rotation axis 100 in outward directions 218B, 218C and 218D, respectively. Pins 13B, 13C and 13D can move relatively in elongate holes 18D, 18C and 18D along longitudinal directions 118B, 118C and 118D, respectively, thereby preventing rotor 1 from being displaced with reference to rotatable housing 14 even when case 18 expands. When case 18 contracts, elongate holes 18B, 18C and 18D move in the directions opposite to directions 218B, 218C and 218D, respectively. That is, even when case 18 contracts, rotor 1 is not displaced with reference to rotatable housing 14. Thus, even in FIG. 3B, rotation axis 100 of rotor 1 agrees with rotation axis 110 of steering 11, the object, similarly to in FIG. 3A.

As described, elongate holes 18B, 18C and 18D and pins 13B, 13C and 13D absorb the dimensional changes of case 18 and fixed housing 13 produced due to the thermal expansion and contraction. Even if case 18, fixed housing 13, or rotatable housing 14 expands or contracts, rotor 1 is not displaced with reference to rotatable housing 14 and fixed housing 13.

Thus, engaging part 1C does not deviate positionally with reference to cutout 14C, and consequently, does not produce a gap between rotatable housing 14 and fixed housing 13 which may produce the difference between the rotation angles of rotatable housing 14 and rotor 1. Thus, even when case 18 expands or contracts, rotation angle detector 20 detects the rotation angle of steering wheel 11, the object, accurately and reliably based on the rotation angle of rotor 1.

Figure 4:
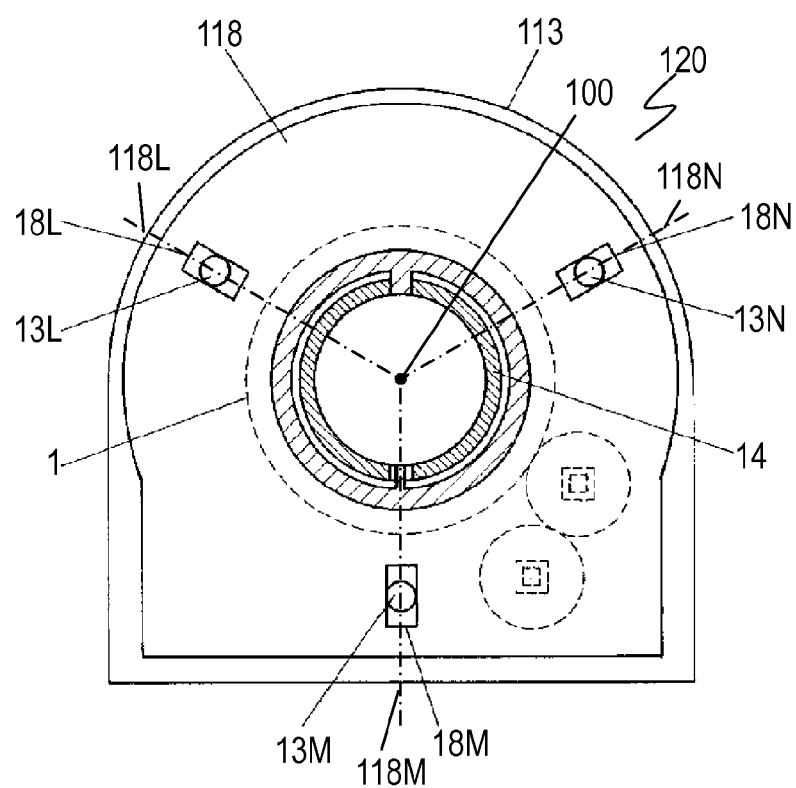
FIG. 4 is a plan view of another rotation angle detector in accordance with the embodiment.
Figure 5A:
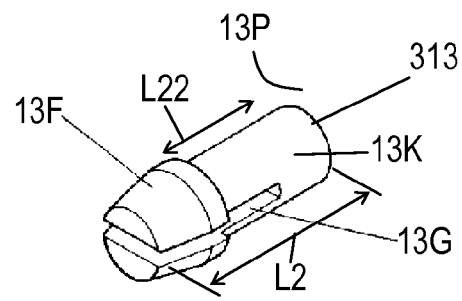
FIGS. 5A and 5B are perspective views of pins of a rotation angle detector in accordance with the embodiment.

FIG. 4 is a plan view of another rotation angle detector 120 in accordance with the embodiment. Components identical to those of rotation angle detector 20 shown in FIG. 3A are denoted by the same reference numerals, and their description will be omitted. Rotation angle detector 120 shown in FIG. 4 includes case 118 and fixed housing 113 instead of case 18 and fixed housing 13 of rotation angle detector 20 shown in FIG. 3. Fixed housing 113 has three pins 113L, 113M and 113N protruding toward case 118. Case 118 has elongate holes 18L, 18M and 18N provided therein. Elongate holes 18L, 18M, and 18N have longitudinal directions 118L, 118M and 118N extending radially from rotation axis 100 of rotor 1 and perpendicularly to rotation axis 100. Elongate holes 18L, 18M and 18N are located by equal angular intervals, 120 degrees, about rotation axis 100. Pins 13L, 13M and 13N are inserted into elongate holes 18L, 18M and 18N, respectively. This structure allows rotation angle detector 120 to detect the rotation angle of the object accurately and reliably, similarly to rotation angle detector 20 shown in FIG. 3A, even when case 118 expands or contracts FIG. 5A is a perspective view of another pin 313 in accordance with the embodiment. Length L1 of each of pins 13B to 13D in parallel with rotation axis 100 shown in FIG. 2 may be either longer or shorter than thickness T1 of case 18 in parallel with rotation axis 100. Length L2 of pin 313 in parallel with rotation axis 100 is larger than thickness T1 of case 18. As shown in FIG. 5A, pin 313 includes base part 13K and claw part 13F provided formed at the tip of base part 13K Base part 13K extends from surface 13P facing case 18. The diameter of claw part 13F is larger than that of base part 13K. Pin 313 has slit 13G provided therein from claw part 13F to base part 13K. Length L22 of base part 13K is slightly larger than thickness T1 of case 18. Pins 313 instead of pins 13B, 13C and 13D are pushed into elongate holes 18B, 18C and 18D so as to position and fix case 18. Thereby, rotation angle detector 20 is held on rotary coupler 12 with a single operation.

Figure 5B:
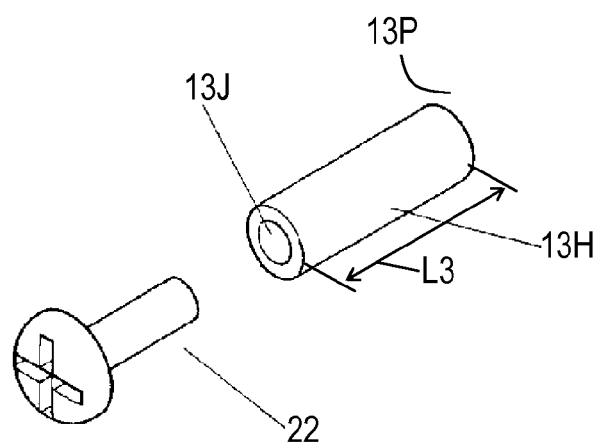
Figure 6:
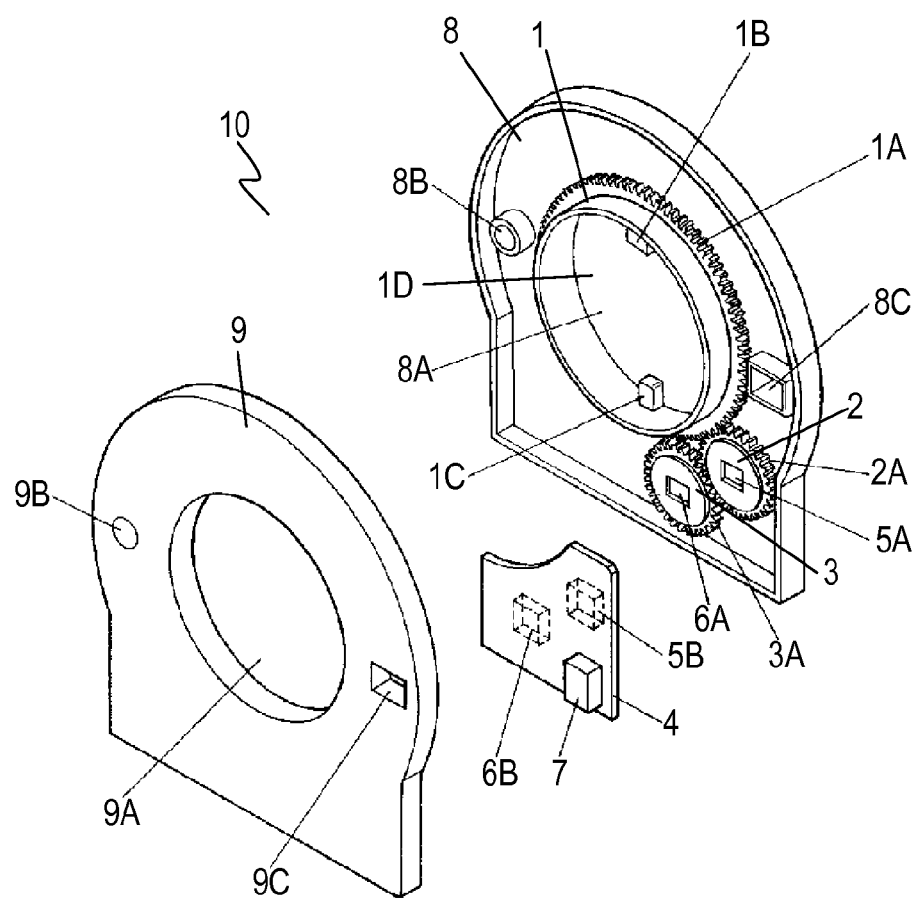
FIG. 6 is an exploded perspective view of a conventional rotation angle detector.
Figure 7:
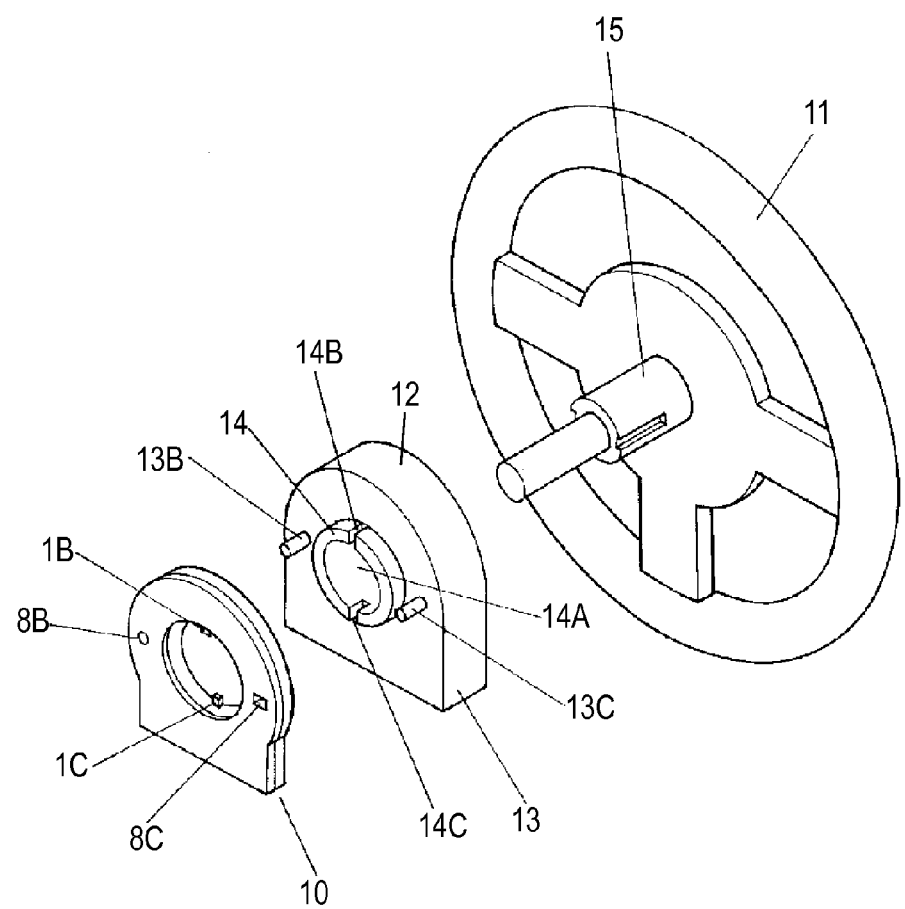
FIG. 7 is an exploded perspective view of a vehicle having the conventional rotation angle detector mounted thereto.
Figure 8A:
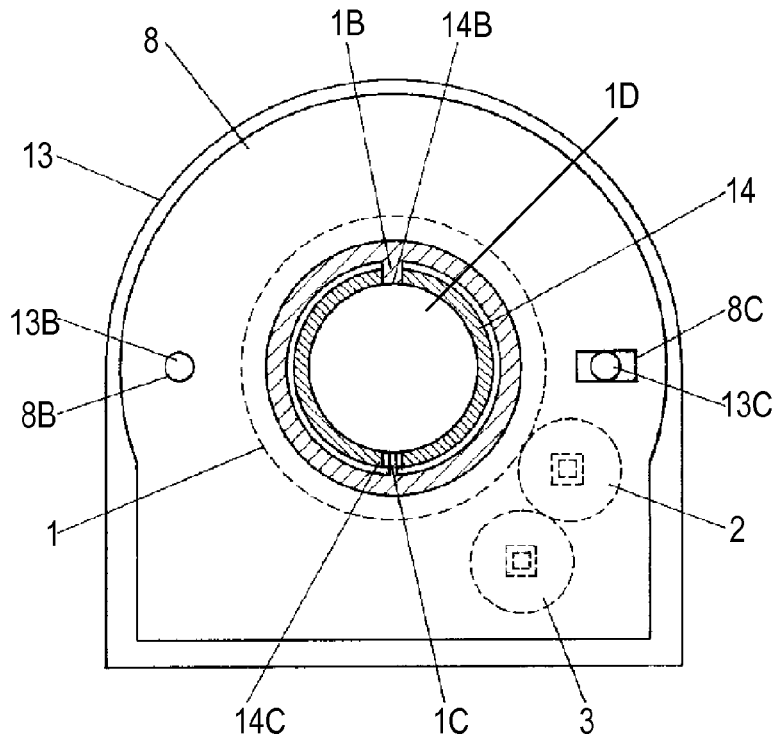
FIGS. 8A and 8B are plan views of the conventional rotation angle detector.
Figure 8B:
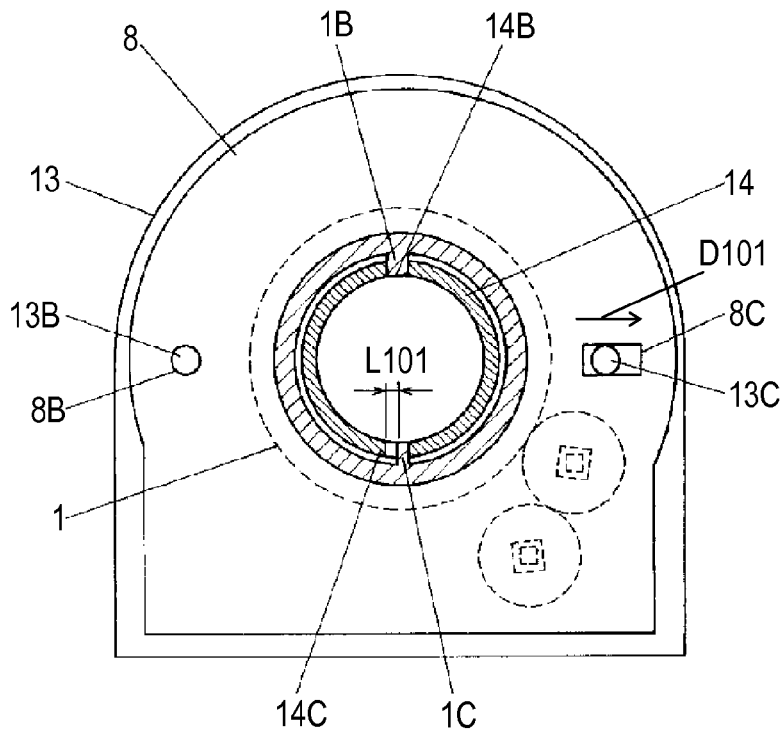

FIG. 5B is a perspective view of further pin 13H. Pin 13H has hollow 13J provided therein. Length L3 of pin 13H in parallel with rotation axis 100 is slightly larger than thickness T1 of case 18. Pins 13H are inserted into elongate holes 18B, 18C and 18D, and then, screw 22 is secured into hollow 13J of each of pins 13H, thereby holding case 18 securely on rotary coupler 12.

In rotation angle detector 20 (120) in accordance with the exemplary embodiment, three elongate holes 18B, 18C and 18D (18L, 18M, and 18N) are provided in case 18 (118). In a rotation angle detector according to the embodiment, case 18 (118) may have more than three elongate holes provided therein. In this case, fixed housing 13 (113) of rotary coupler 12 for positioning case 18 (118) has the same number of pins as the elongate holes, and the pins are inserted into respective ones of the elongate holes. For example, four elongate holes may be formed in a periphery of rotor 1 of case 18 by angular intervals of 90 degrees, or five elongate holes may be formed in it by angular intervals of 72 degrees, providing the same effects. However, an excessive number of elongate holes formed in case 18 increases the number of pins of fixed housing 13, accordingly making the structure complicated, and preventing rotation angle detector 20 and rotary coupler 12 from being positioned easily during their assembling. The number of elongate holes, i.e., the number of the pins, may preferably be three or four.

In rotation angle detector 20 in accordance with the embodiment, flat gears 1A, 2A and 3A being engaged with each other causes rotor 1 and detecting bodies 2 and 3 to rotate in conjunction with each other. The rotation angle detector in accordance with the embodiment may include a rough part or a frictional part instead of the flat gears. The rough part or the frictional part can transfer the rotation to the outer circumference of detecting bodies 2 and 3 and rotating rotor 1, thereby allowing detecting bodies 2 and 3 and rotor 1 to rotate in conjunction with each other.

What is claimed is:

1. A rotation angle detector arranged to detect a rotation angle of an object, said rotation angle detector comprising:
    a rotor arranged to rotate about a rotation axis according to a rotation of the object;
    a detecting unit for detecting a rotation of the rotor;
    a controller for detecting a rotation angle of the rotor based on a detection signal output from the detecting unit; and
    a case rotatably accommodating the rotor,
    wherein the case has at least three elongated holes therein angularly spaced apart about the rotation axis of the rotor, and the elongated holes have longitudinal directions extending radially from the rotation axis of the rotor, and
    wherein two of the at least three elongated holes extend along a straight line crossing the rotation axis.

2. The rotation angle detector of claim 1, further comprising a detecting body that rotates in conjunction with the rotor, wherein the detecting unit detects the rotation of the rotor by detecting a rotation of the detecting body.

3. The rotation angle detector of claim 1, wherein
    the case is arranged to be positioned by a coupler having at least three pins protruding toward the case,
    the at least the three pins are arranged to be inserted into the at least the three elongated holes, respectively.

4. A rotation angle detector arranged to detect a rotation angle of an object, said rotation angle detector comprising:
    a rotor arranged to rotate about a rotation axis according to a rotation of the object;
    a detecting unit for detecting a rotation of the rotor;
    a controller for detecting a rotation angle of the rotor based on a detection signal output from the detecting unit;
    a case rotatably accommodating the rotor, and
    a coupler for positioning the case, wherein
    the coupler has at least three pins protruding toward the case,
    the case has at least three elongated holes therein angularly spaced about the rotation axis of the rotor, and the elongated holes have longitudinal directions extending radially from the rotation axis of the rotor, and
    the at least the three pins are inserted into the at least three elongated holes, respectively, and
    two of the at least three elongated holes extend along a straight line crossing the rotation axis.

5. A rotation angle detector of claim 4, further comprising a detecting body that rotates in conjunction with the rotor, wherein the detecting unit detects the rotation of the rotor by detecting a rotation of the detecting body.

* * * * *